US009014913B2

(12) United States Patent
Heravi et al.

(10) Patent No.: US 9,014,913 B2

(45) Date of Patent: Apr. 21, 2015

(54) MULTI-MODE RADIO FREQUENCY WINCH CONTROLLER

(71) Applicant: Warn Industries, Inc., Clackamas, OR (US)

(72) Inventors: Oliver Heravi, Tigard, OR (US); Darren G. Fretz, Canby, OR (US); Bryan M. Averill, Portland, OR (US); Jeff Walston, Gig Harbor, WA (US); Ian Wendler, Portland, OR (US)

(73) Assignee: Warn Industries, Inc., Clackamas, OR (US)

(*) Notice: Subject to any disclaimer, the term of this patent is extended or adjusted under 35 U.S.C. 154(b) by 27 days.

(21) Appl. No.: 13/790,544

(22) Filed: Mar. 8, 2013

(65) Prior Publication Data

US 2014/0257631 A1 Sep. 11, 2014

(51) Int. Cl.

| | |
|---|---|
| ***G06F 7/00*** | (2006.01) |
| ***B66D 1/22*** | (2006.01) |
| ***G05B 11/01*** | (2006.01) |
| ***B66D 1/42*** | (2006.01) |
| ***B66D 1/12*** | (2006.01) |
| ***B66D 1/14*** | (2006.01) |
| ***B66D 1/16*** | (2006.01) |
| ***G08C 17/00*** | (2006.01) |

(52) U.S. Cl.

CPC .. *B66D 1/42* (2013.01); *B66D 1/12* (2013.01); *B66D 1/14* (2013.01); *B66D 1/16* (2013.01); *G08C 17/00* (2013.01); *G08C 2201/30* (2013.01)

(58) Field of Classification Search

USPC ........................... 701/36; 254/344; 340/12.22

See application file for complete search history.

(56) References Cited

U.S. PATENT DOCUMENTS

| | | | | |
|---|---|---|---|---|
| 2,374,892 | A | 5/1945 | Peterson | |
| 3,315,914 | A | 4/1967 | Turner | |
| 3,628,115 | A | 12/1971 | Pruitt | |
| 3,772,825 | A | 11/1973 | Gagnon | |
| 3,784,165 | A | 1/1974 | Pruitt | |
| 3,876,183 | A | 4/1975 | Strout et al. | |
| 3,916,555 | A | 11/1975 | Booth et al. | |
| 3,922,808 | A | 12/1975 | Rieth et al. | |
| 4,000,653 | A | 1/1977 | Booth et al. | |
| 4,331,323 | A | 5/1982 | Sekimori et al. | |
| 4,617,002 | A | 10/1986 | Ishimoto et al. | |
| 4,632,329 | A | 12/1986 | Burley | |
| 4,721,833 | A | 1/1988 | Dubay | |
| 5,327,592 | A | 7/1994 | Stump | |
| 5,692,735 | A | 12/1997 | Aho et al. | |
| 5,762,282 | A | 6/1998 | Wolner | |
| 5,842,684 | A * | 12/1998 | Aho | 254/344 |
| 6,151,774 | A | 11/2000 | Nold, III | |
| 6,369,530 | B2 | 4/2002 | Kovach et al. | |
| 6,382,241 | B1 | 5/2002 | Setrum | |
| 6,474,588 | B2 | 11/2002 | Valverde | |

(Continued)

*Primary Examiner* — Thomas G Black

*Assistant Examiner* — Tyler Paige

(74) *Attorney, Agent, or Firm* — Alleman Hall McCoy Russell & Tuttle LLP

(57) ABSTRACT

A wireless remote forms a two-way radiofrequency (RF) communication network with a winch control module that allows the wireless remote to control both the winch and additional vehicle accessories through the winch control module. Further accessory control modules allow the control of more accessories utilizing the wireless remote by way of RF communication. Feedback from either the winch control module or the accessory control module is sent back to the wireless remote to allow the operator to view the current operating conditions of the winch or accessories.

38 Claims, 11 Drawing Sheets

(56) References Cited

U.S. PATENT DOCUMENTS

| | | | | |
|---|---|---|---|---|
| 6,523,806 | B2 | 2/2003 | Bartal | |
| 6,554,252 | B2 | 4/2003 | Kazerooni et al. | |
| 6,995,682 | B1 * | 2/2006 | Chen et al. | 340/12.22 |
| 7,090,200 | B2 | 8/2006 | Morse et al. | |
| 7,543,798 | B2 * | 6/2009 | Cunningham | 254/266 |
| 7,789,374 | B2 | 9/2010 | Averill et al. | |
| D640,442 | S | 6/2011 | Borntrager et al. | |
| 7,984,894 | B1 | 7/2011 | Chauza | |
| 8,006,958 | B2 | 8/2011 | Starks et al. | |
| 8,485,501 | B1 * | 7/2013 | Hard | 254/134 |
| 2006/0064223 | A1 * | 3/2006 | Voss | 701/52 |
| 2008/0023681 | A1 * | 1/2008 | Cunningham | 254/362 |
| 2008/0061276 | A1 * | 3/2008 | Averill et al. | 254/323 |
| 2010/0224843 | A1 | 9/2010 | Christensen et al. | |
| 2010/0332077 | A1 | 12/2010 | Hanson et al. | |
| 2011/0123304 | A1 | 5/2011 | Thomas et al. | |
| 2011/0180770 | A1 * | 7/2011 | Karambelas et al. | 254/344 |
| 2012/0160796 | A1 * | 6/2012 | Weckbecker et al. | 212/284 |

* cited by examiner

MULTI-MODE RADIO FREQUENCY WINCH CONTROLLER

FIELD

The present disclosure relates to vehicle winches and more particularly, to a multi-mode radio frequency winch controller.

BACKGROUND

This section provides background information related to the present disclosure which is not necessarily prior art.

Vehicles, such as off-road vehicles, commercial/utility trucks used in construction and by contractors, tow trucks, plow trucks, and other utility work vehicles are often equipped with accessories such as winches, plows, lights, and compressors. The installation of these accessories as aftermarket items can be very complicated and time-consuming. In particular, each accessory requires an activation switch that can be preferably mounted within the cabin to allow the vehicle operator to operate the accessory from within the cabin. Accordingly, a great deal of wiring is required to connect the switches to the accessory and connect the accessory to the vehicle battery.

In addition, vehicle accessories such as winches require high-current (or capacity) cables which are expensive and which are currently limited to a single function for operating the winch.

SUMMARY

This section provides a general summary of the disclosure, and is not a comprehensive disclosure of its full scope or all of its features.

The present disclosure provides an advanced wireless remote that forms a two-way radiofrequency (RF) communication network with a winch control module that allows the wireless remote to control both the winch and additional vehicle accessories through the winch control module. The optional addition of further accessory control modules further allow the control of more accessories utilizing the wireless remote by way of RF communication. Feedback from either the winch control module or the accessory control module is sent back to the wireless remote to allow the operator to view the operating conditions of the winch or accessories. A secured mapping of one device to another is accomplished by way of a pairing process. The pairing process assures that the intended devices can communicate within a mesh network but cannot communicate with devices outside the network. The pairing process also eliminates interference from devices outside the network that have not been paired.

According to an aspect of the present disclosure, a winch is provided including a drum and a motor drivingly attached to the drum. A pulling line, such as a rope or cable, is wrapped around the drum. A battery is selectively connected to the motor via a high capacity winch power cable. A controller is provided for connecting the motor to the battery and an auxiliary electrical device such as a vehicle accessory is selectively connected to the battery via the high capacity winch power cable.

According to a further aspect of the present disclosure, an accessory control system is provided for a vehicle having a battery and includes an accessory control module connected to the battery. An auxiliary electrical device is connected to the accessory control module and a control device in communication with the accessory control module provides user input for operating the auxiliary electrical device. The control device provides two-way communication with the control module providing control signals for operation of the auxiliary electrical device and for receiving signals indicating an operational status of the auxiliary electrical device. The control device includes a display providing a visual indication of the operational status of the auxiliary electrical device. The control device also includes a mode selection input for selecting different operating modes for controlling and displaying an operational status for different ones of a plurality of auxiliary electrical devices.

According to a further aspect of the present disclosure, an accessory control system is provided for a vehicle having a battery and includes an accessory control module connected to the battery. An auxiliary electrical device is connected to the accessory control module. A control device is in communication with the accessory control module to provide user input for operating the auxiliary electrical device. The vehicle includes manufacturer installed accessories and a manufacturer installed control unit for controlling the manufacturer installed accessories and the accessory control module is separate from the manufacturer installed control unit.

According to a further aspect of the present disclosure, a winch is provided including a drum and a motor drivingly attached to the drum. A pulling line such as a cable or rope is wrapped around the drum. A battery is selectively connected to the motor via a winch power cable, and a winch controller is provided for connecting the motor to the battery. An auxiliary electrical device is connected to the winch controller for controlling operation of the auxiliary electrical device.

According to a further aspect of the present disclosure, a winch is provided including a winch controller for connecting a power source to the motor of the winch. A remote control device provides a two-way wireless communication with the controller for providing control signals for operation of the winch and for receiving signals from the controller indicating an operational status of the winch. The remote control device includes a display providing a visual indication of the operational status of the winch. The operational status can include at least one of a high temperature, low battery, overload, and free spool condition.

According to a further aspect of the present disclosure, the winch includes a drive train for delivering drive torque from the motor to the rotatable drum. The drivetrain includes a clutch that includes a clutch actuator for disengaging the clutch to allow the rotatable drum to free spool. A winch control module includes a processor unit in communication with a winch contactor control switch and a winch clutch actuator control switch for operating the motor and the clutch actuator. The winch control module further includes an accessory control switch in communication with the processor unit for controlling operation of an auxiliary electrical device connected to the accessory control switch. The winch control module includes a receiver module for receiving control signals and communicating the control signals to the processor unit.

According to a further aspect of the present disclosure, a two-way wireless control system is provided so that the winch and auxiliary devices communicate with the remote control device on a unique identification code that is established by the device through an operator "pairing" process.

The wireless remote for controlling the winch can include a first button that is dedicated to control the winch in the power-in direction, a second button dedicated to control the winch in the power out direction, a third button configured for selection of a control mode of a fourth button, wherein the fourth button controls the on and off states of additional vehicle accessories. Additional buttons can also be utilized in various other configurations.

According to a further aspect of the present disclosure, the wireless remote can be downloaded with software or data through a data connection to a programming module or computer. The wireless remote can have its software and data modified through a connection to the computer or a programming module.

The wireless remote can be powered by a rechargeable battery that can be connected through a plug on the remote body.

According to a further aspect of the present disclosure, the winch control module is configured to distribute vehicle battery power to a winch and one or more vehicle accessory. The vehicle accessories can be connected directly to the winch control module with a plug and socket connector. The winch control module is configured to monitor the fault state of an accessory and to exchange data with the remote.

The wireless remote can be capable of updating the winch control module and accessory control modules through wireless communication, and can communicate through a secured and encrypted wireless communication protocol.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
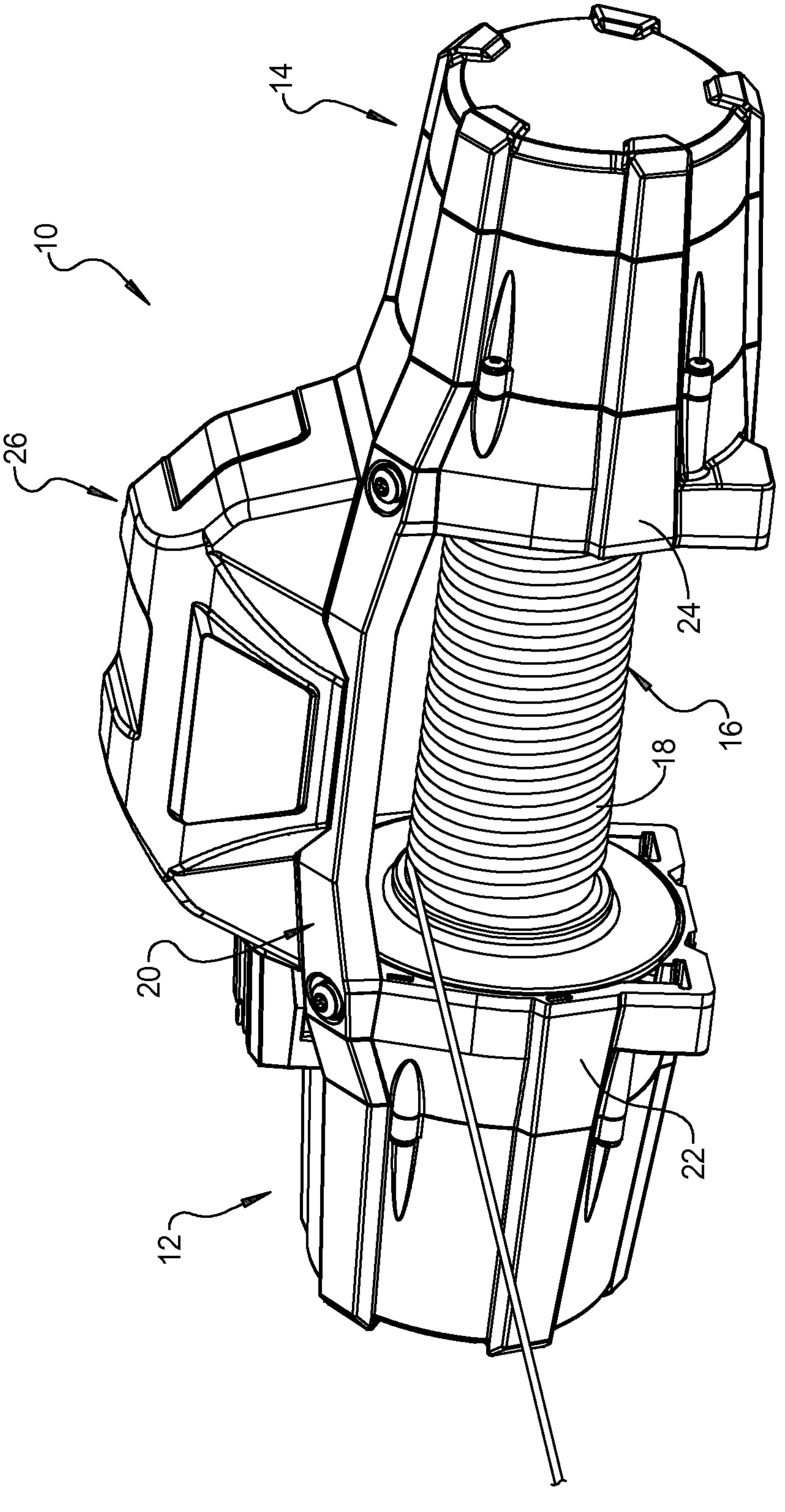
FIG. 1 is a perspective view of a winch according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a winch 10 according to the principles of the present disclosure will now be described. The winch 10 includes a motor assembly 12 drivingly connected to a gear reduction unit 14 which provides driving torque to a rotatable drum 16. A cable 18 can be wound onto, or off from, the rotatable drum 16 to provide various pulling operations. A tie plate 20 can be disposed for connection between a first drum support 22 of the motor assembly 12 and a second drum support 24 of the gear reduction unit 14. A control unit 26 can be removably mounted to the tie plate 20. The first drum support 22 and the second drum support 24 provide a bearing support structure for rotatably supporting the rotatable drum 16.

Figure 2:
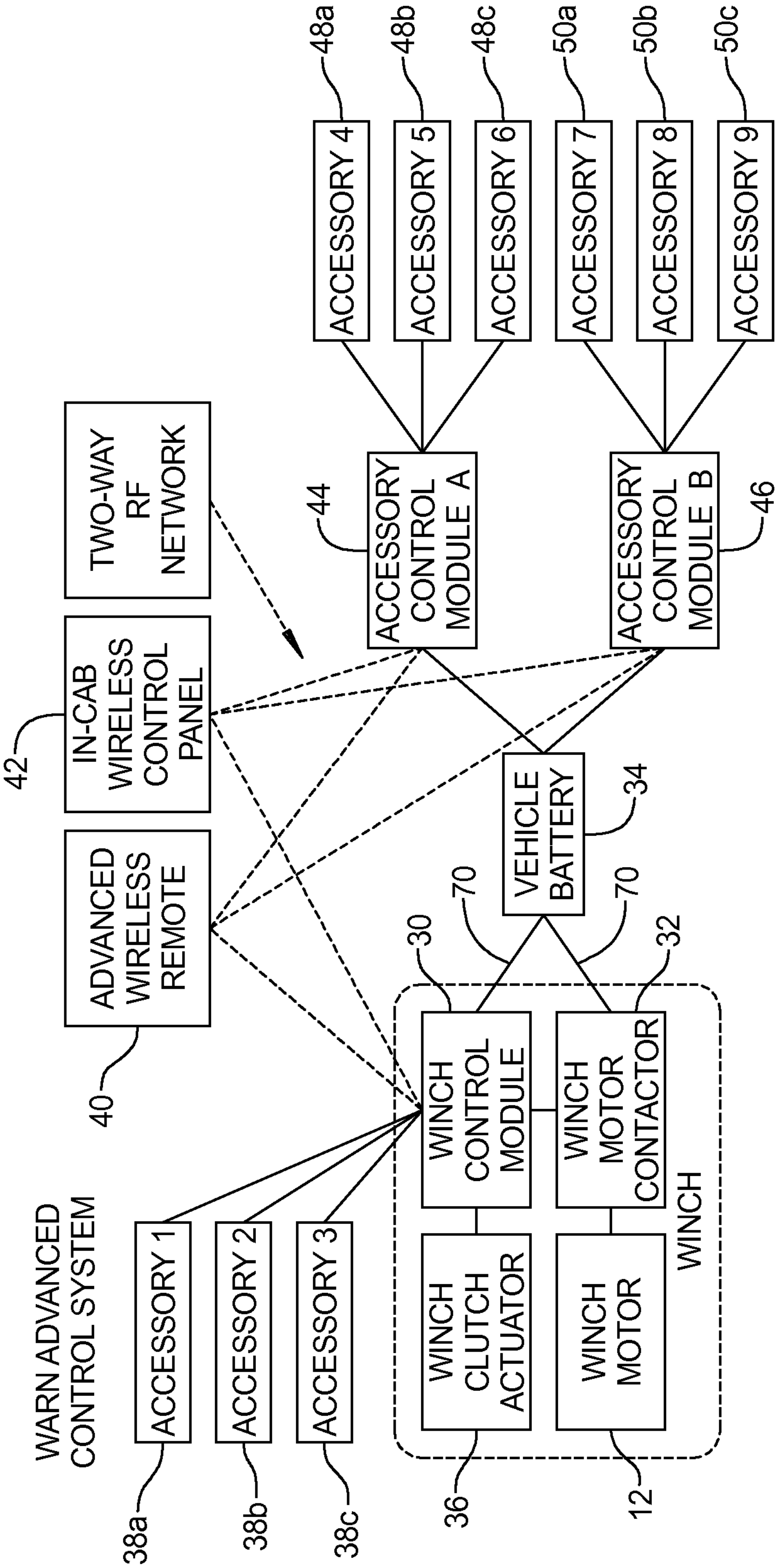
FIG. 2 is a schematic illustration of the winch and accessory control system according to the principles of the present disclosure.

With reference to FIG. 2, the control unit 26 of the winch 10 includes a winch control module 30 and a winch motor contactor 32 which are each connected to a vehicle battery 34. The winch control module 30 provides control signals to the winch motor contactor 32 which can supply current from the vehicle battery 34 to the winch motor 12. The winch control module 30 also can control a winch clutch actuator 36 that can be in the form of an electronic solenoid. In addition, a plurality of accessories 38*a*-38*c* can be connected to the winch control module 30. The winch control module 30 can provide control signals to the accessories 38*a*-38*c* and the accessories 38*a*-38*c* can provide feedback signals to the winch control module 30. The control module 30 can provide an electrical connection between the vehicle battery 34 and the accessories 38*a*-38*c*.

A wireless remote 40 can be provided for providing control signals to the winch control module 30 and for receiving the feedback signals from the winch control module 30. An in-cab wireless control panel 42 can also be provided for providing control signals to the winch control module 30 and for receiving the feedback signals from the winch control module 30 regarding an operational status of the winch, and multiple accessories 38*a*-38*c*. The communication between the winch control module 30 and the wireless remote 40 and the in-cab wireless control panels 42 can be performed by a pairing process that provides a two-way RF mesh network connection using a secured and encrypted wireless communication protocol.

Additional accessory control modules 44, 46 can also be provided in connection with the vehicle battery 34 for providing control of additional accessories 48*a*-48*c* and 50*a*-50*c*. The number of additional accessory control modules 44, 46 can be determined based upon the number of desired accessories and the number of accessories that are desired to be connected to each accessory control module 44, 46. Each of the accessory control modules 44, 46 can also be provided with two-way RF communication with the wireless remote 40 and the in-cab wireless control panel 42 so that the accessories 48*a*-48*c* and 50*a*-50*c* can be controlled from either of the wireless remote 40 or the in-cab wireless control panel 42 and the accessory control modules 44, 46 can provide feedback via the two-way RF network to the wireless remote 40 and the in-cab wireless control panel 42 indicating the operational or fault status of each accessory 48*a*-48*c*, 50*a*-50*c*.

Figure 3:
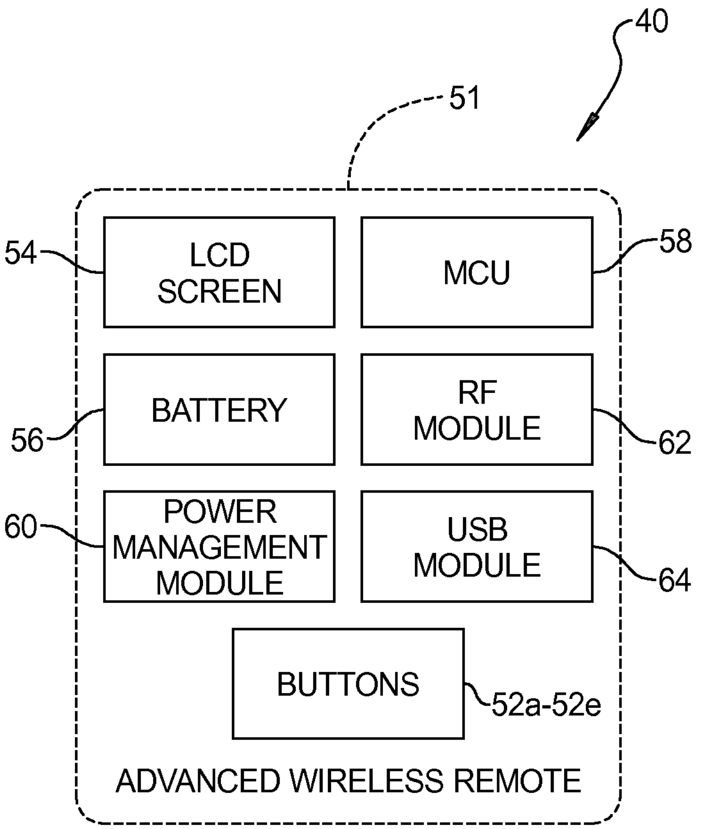
FIG. 3 is a schematic illustration of the components of the wireless remote according to the principles of the present disclosure.
Figure 4:
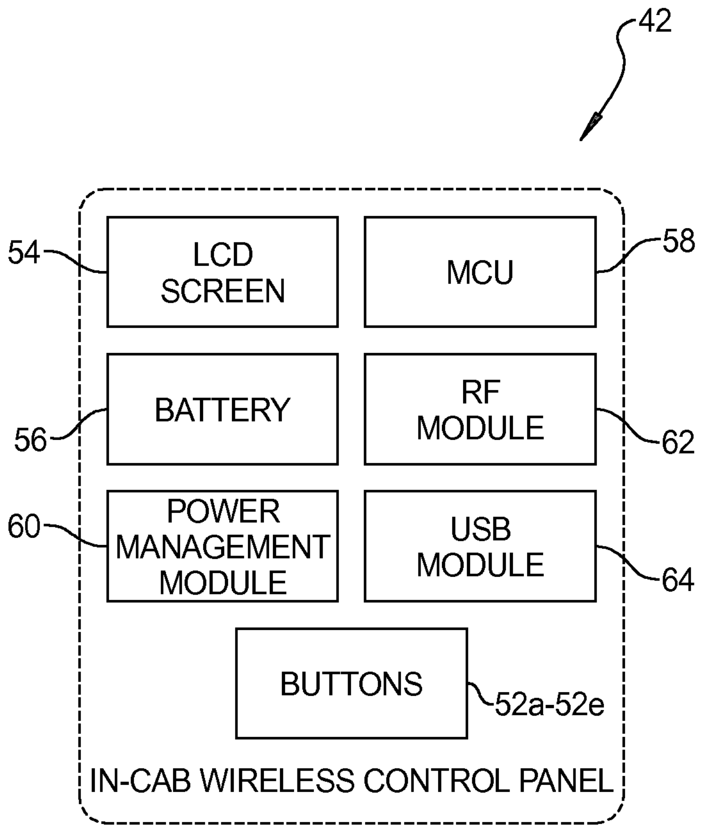
FIG. 4 is a schematic illustration of the components of the in-cab control panel according to the principles of the present disclosure.
Figure 9:
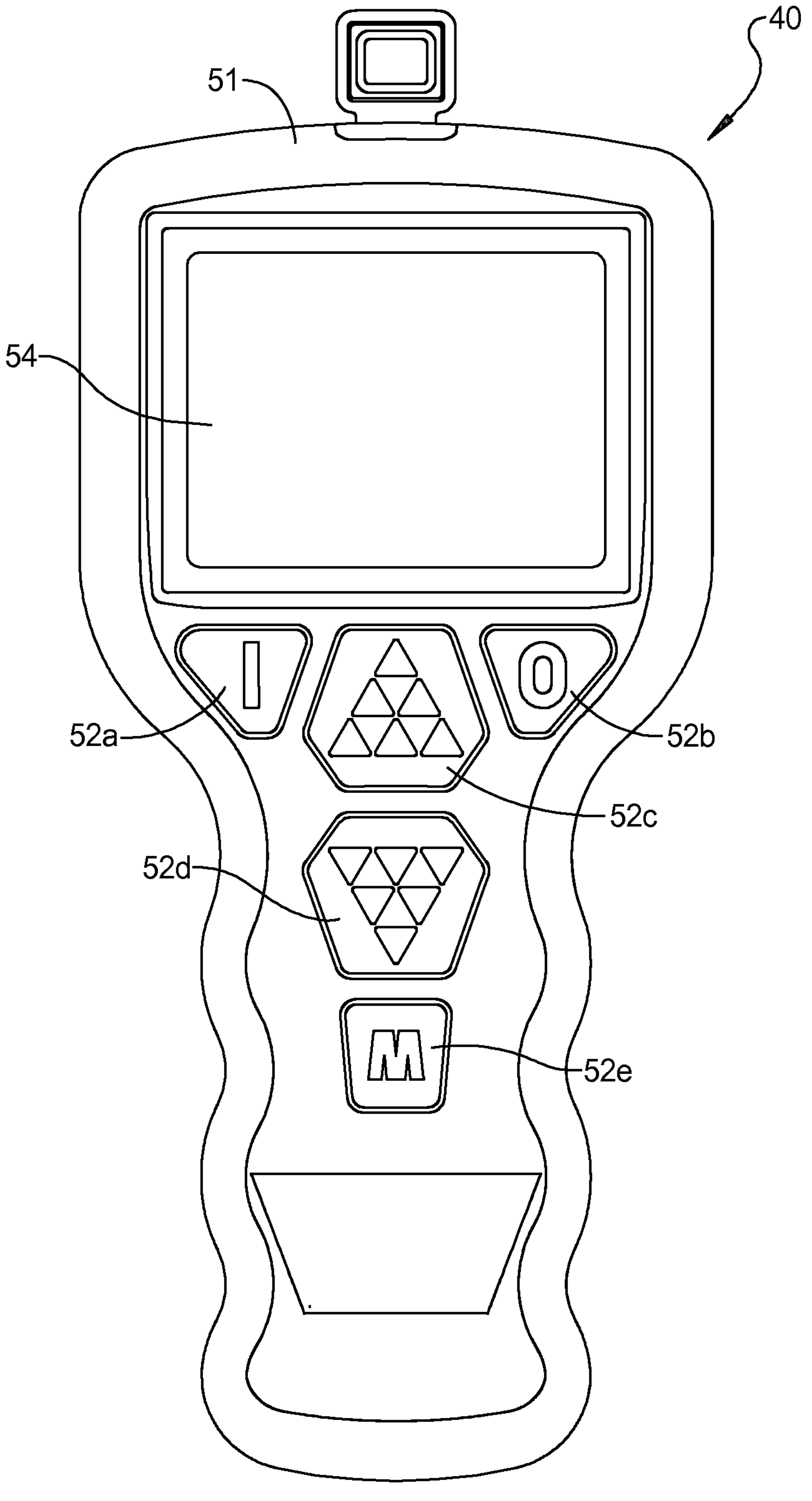
FIG. 9 is a plan view of an exemplary wireless remote control unit according to the principles of the present disclosure.

The wireless remote 40 is a handheld device for controlling the winch and accessory functions. An exemplary handheld wireless remote device 40 is shown in FIG. 9. With reference to FIG. 9, the remote handheld device has a housing 51 with several buttons 52*a*-52*e* for control input and an LCD screen 44 for system feedback. FIG. 3 is also a schematic depiction of the components of the wireless remote 40 including the buttons 52*a*-52*e* and LCD screen 54. The wireless remote 40 also includes a rechargeable battery 56, a microcontroller unit (MCU) 58, a power management module 60, an RF module 62, and a USB module 64. With continued reference to FIG. 9, the buttons 52*a*-52*e* of the wireless remote 40 are arranged to accomplish the desired functions of the winch 10 or accessories 38*a*-38*c*, 48*a*-48*c*, 50*a*-50*c*. The winch 10 will be controlled by two dedicated buttons 52*a*, 52*b* that control the power-in and power-out states of the winch which allow the cable to be pulled in or out, respectively. An additional button 52*c* is provided to control the winch clutch actuator and a fourth button 52*d* is provided to control the accessories. A fifth button 52*e* is provided to select the desired control mode and to access programmable functions. An optional sixth button can be provided to reset the remote 40 should such a reset be desired.

The LCD screen 54 can provide visual feedback to the user. The feedback will include the status of control inputs such as winch power-in or power-out, accessories on or off, and to indicate which control mode has been selected. Feedback may also include information such as vehicle battery voltage, winch motor current draw, winch motor temperature, winch load, and winch clutch position. Another type of feedback is the functional characteristic of accessories such as the pressure of an air compressor or the power level of the lighting system. Photographs, maps, user manuals, homepages, and other images may be uploaded into the microcontroller unit 58 of the wireless remote 40 for display on the LCD screen 54. The user manual can include illustrations of proper use of the winch as well as safety tips and safety warnings. The safety tips and safety warnings displayed on the LCD screen 58 of the wireless remote 40 can be required to be acknowledged by the user as an initial setup, or as a periodic warning.

The in-cab wireless control panel 42 can be designed much like the advanced wireless remote 40 except that it is designed specifically as a master control panel for vehicle accessories within the cab of the vehicle. As such, the in-cab wireless control panel 42 includes buttons 52*a*-52*e* an LCD screen 54, a rechargeable battery 56, a microcontroller unit (MCU) 58, a power management module 60, an RF module 62, and a USB module 64. The in-cab wireless control panel may also have more buttons, a larger screen, and the ability to access more sophisticated control modes. Some modes may be activated and others deactivated depending on vehicle driving conditions. Additional feedback sensors may be used to detect the driver or determine if the vehicle engine is running. This information may be used to configure the control options.

Figure 11:
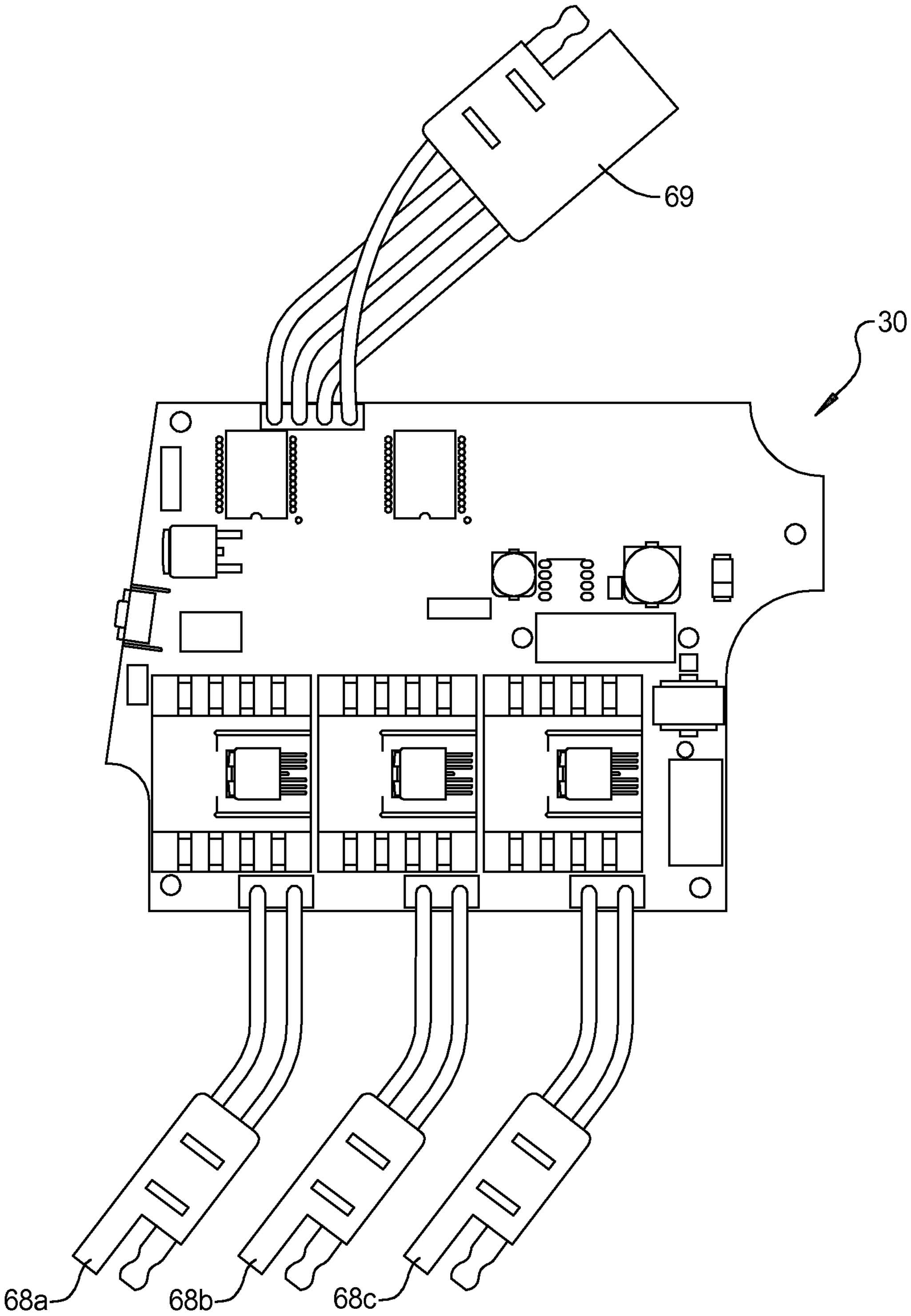
FIG. 11 is a plan view of a wireless controller printed circuit board for a winch according to the principles of the present disclosure.

The winch control module 30 resides within the control unit 26 which can be on or near the winch 10. The winch control module 30 first functions to distribute power from the vehicle battery 34 to the winch motor 12 and various accessories 38*a*-38*c*. The winch motor 12 uses the most electrical power of any vehicle accessory and is connected to the vehicle battery with very high-capacity electrical cables 70, as shown in FIG. 2. The winch control module 30 is connected to these high-capacity cables and distributes the power to the accessories 38*a*-38*c* that may be plugged into a connector 68*a*-68*c* on the module 30, as shown in FIG. 11.

A second winch control module function is to establish a node in the two-way RF communication network with the wireless remote 40 and in-cab wireless control panel 42. As such, the winch control module 30 communicates with the wireless remote 40 or in-cab wireless control panel 42, or other nodes in the network to send and receive information. Information sent by the winch control module 30 may include winch and accessory operational status information. The information that is received by the winch control module 30 may be winch and accessory operational commands that are sent from the wireless remote 40 or in-cab wireless control panel 42.

A third winch control module function is to switch on or off the winch 10 and accessory 38*a*-38*c* electrical power according to the input commands received from the wireless remote 40 and in-cab wireless control panel 42 and the control programming. The control programming resides within a micro control unit 72 of the winch control module 30. Several accessories 38*a*-38*c* may be controlled by the winch control module 30 utilizing the very high-capacity electrical cables 70 that are required for the winch motor 12. Therefore, the high-capacity electrical cables 70 are utilized for multiple functions, not just supplying electric current to the winch motor 12.

Figure 5:
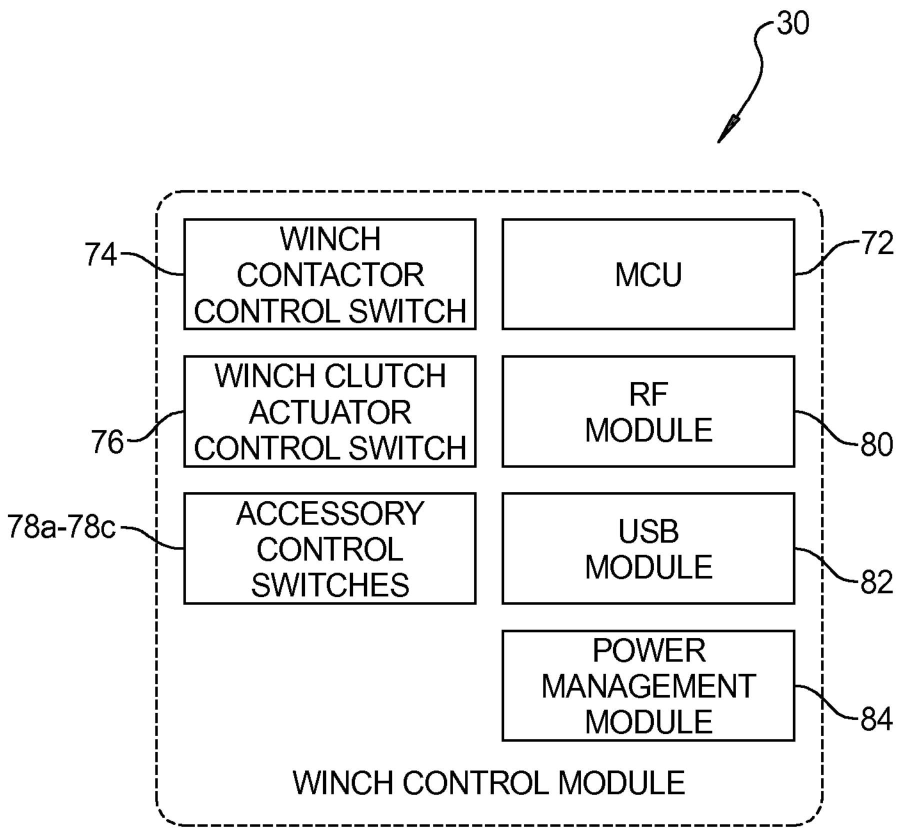
FIG. 5 is a schematic illustration of the components of the winch control module according to the principles of the present disclosure.
Figure 6:
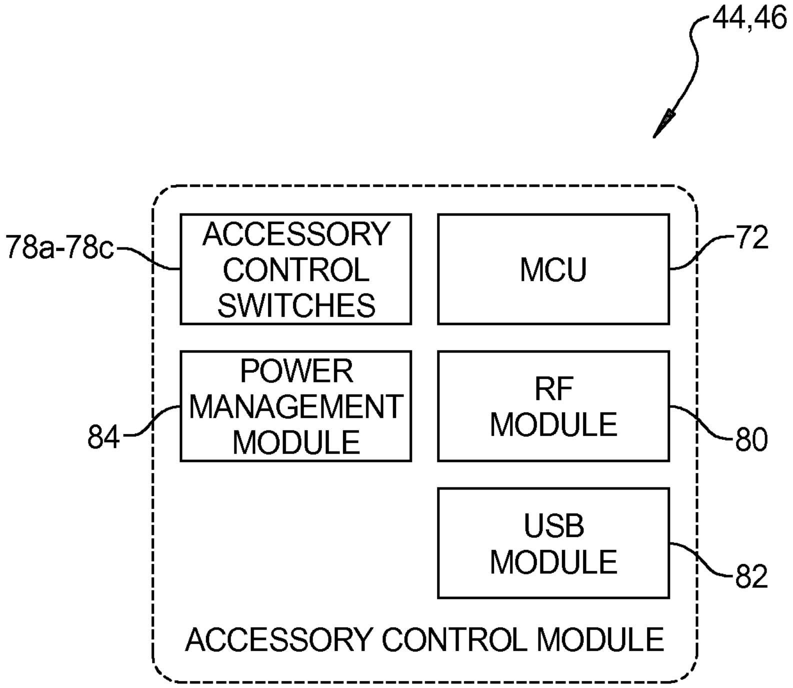
FIG. 6 is a schematic illustration of the components of the accessory control module according to the principles of the present disclosure.

The winch control module 30, as illustrated in FIG. 5, can include the microcontroller unit 72 that contains the programmable data for controlling the operation of the winch 10 and accessories 38*a*-38*c*. A winch contactor control switch 74 is provided for communication with the winch motor contactor 32. A winch clutch actuator control switch 76 is provided for communication with the winch clutch actuator 36. Accessory control switches 78*a*-78*c* can be provided in communication with the various accessories 38*a*, 38*c* for controlling the accessories. An RF module 80 can be provided for providing two-way RF communication between the winch control module 30 and the wireless remote 40 and in-cab wireless control panel 42. The winch control module 30 can also include a USB module to allow the winch control module 30 to be connected to a computer or programming module for programming the MCU 72. The power management module 84 can be provided for managing the distribution of power from the vehicle battery to the winch 10 and various accessories.

The accessory control modules 44, 46 are very much like the winch control module 30, except that they do not reside on the winch 10 or within the control unit 26 of the winch. The accessory control modules 44, 46 can include a microcontroller unit 72, a plurality of accessory control switches 78*a*-78*c*, an RF module, a USB module, and a power management module 84, similarly to the winch control module 30. Instead of being mounted on the winch 10, the accessory control modules 44, 46 may be mounted anywhere on the vehicle where accessories are controlled. Power distribution is accomplished by connecting the accessory control module 44, 46 directly to the vehicle battery instead of the winch motor carrier cables 70. The control programming of the accessory control modules 44, 46 may be reduced to simple on or off command.

The winch 10 can include a feedback system including sensors or other devices which send information, such as motor temperature or electrical demand, to the winch control module 30. The free spool clutch actuator 36 is an electrical device such as an electrical solenoid for shifting the transmission of the winch into a disengaged state to provide a free spool function and to shift the transmission back into an engaged state for normal winch powering in or powering out.

The winch motor contactor 32 and the winch control module 30 are packaged into the control unit 26. The control unit 26 provides electrical connections and component mounting in a single enclosure. Control unit 26 is usually mounted to the winch 10 but may also be mounted a short distance away from the winch by using a remote mounting kit.

For purposes of the present disclosure, accessories are defined as electrical devices that are used with or added to a vehicle. Accessories may include auxiliary lights (spot lights, light bars, sport lighting, brake lights, parking lights, warning lights, etc.), axle differential locking mechanisms which are powered by an air compressor or other electronic devices, small powered tools, or any number of electrical widgets. Some accessories have a moderate electrical power demand which can be supplied by the winch control module 30 or an accessory control module 44, 46. Other accessories that have high electrical power demand may require an electrical connection to the vehicle battery and a power relay. The winch control module 30 or an accessory control module 44, 46 can control the on or off state of the relay.

Figure 7:
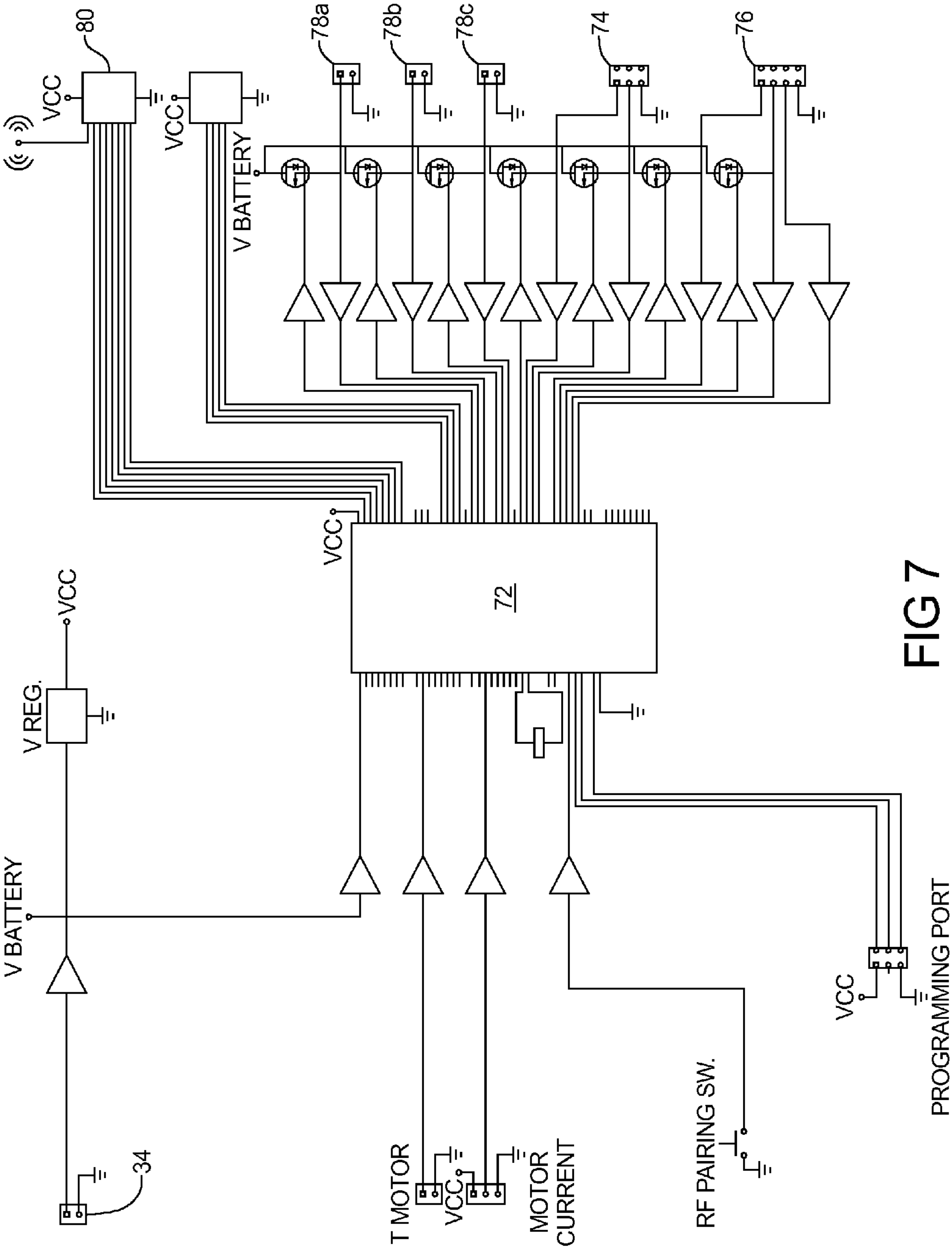
FIG. 7 is a detailed schematic illustration of the components of the winch control module according to the principles of the present disclosure.
Figure 8:
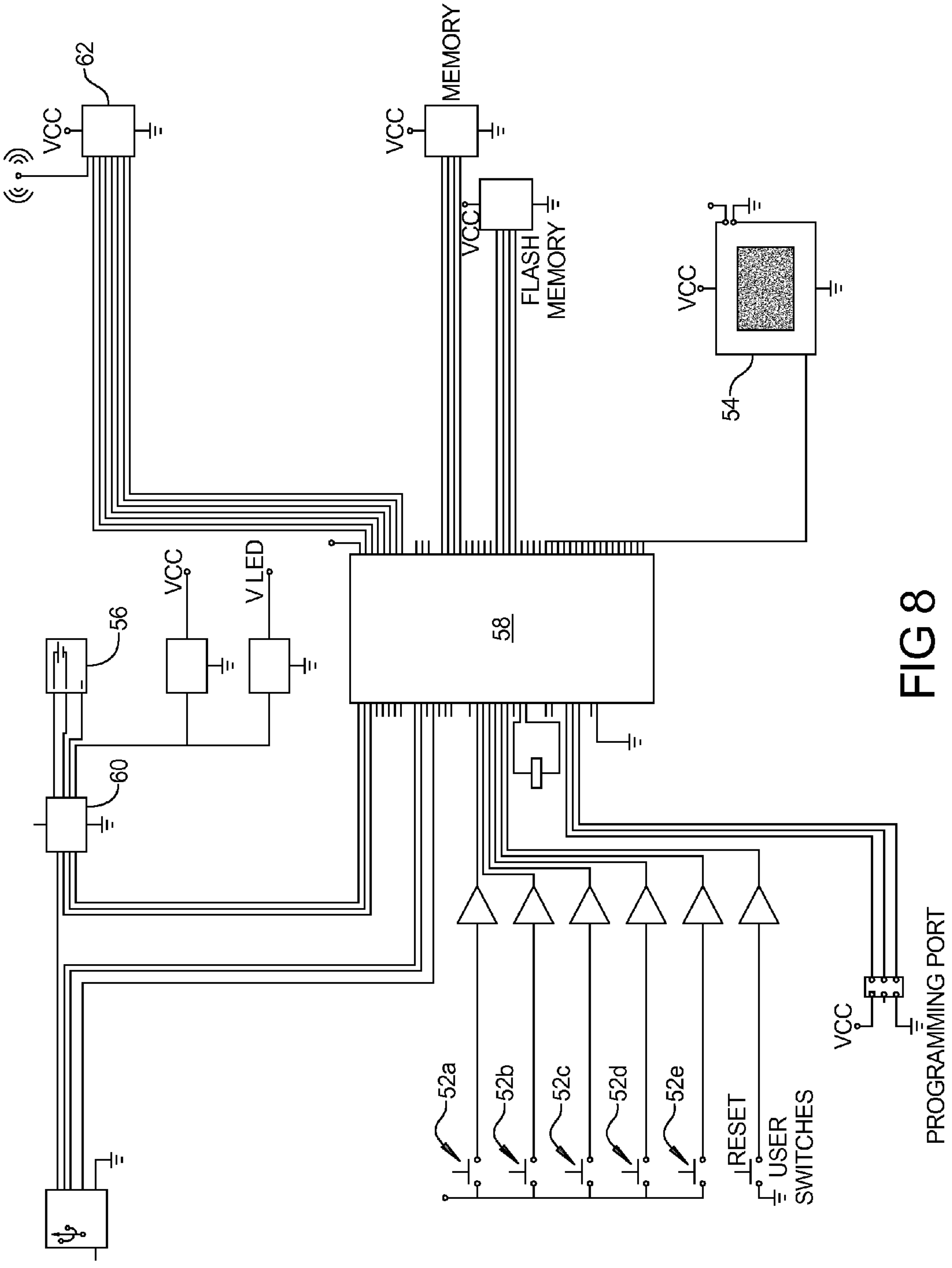
FIG. 8 is a detailed schematic illustration of the components of the wireless remote control according to the principles of the present disclosure.
Figure 10:
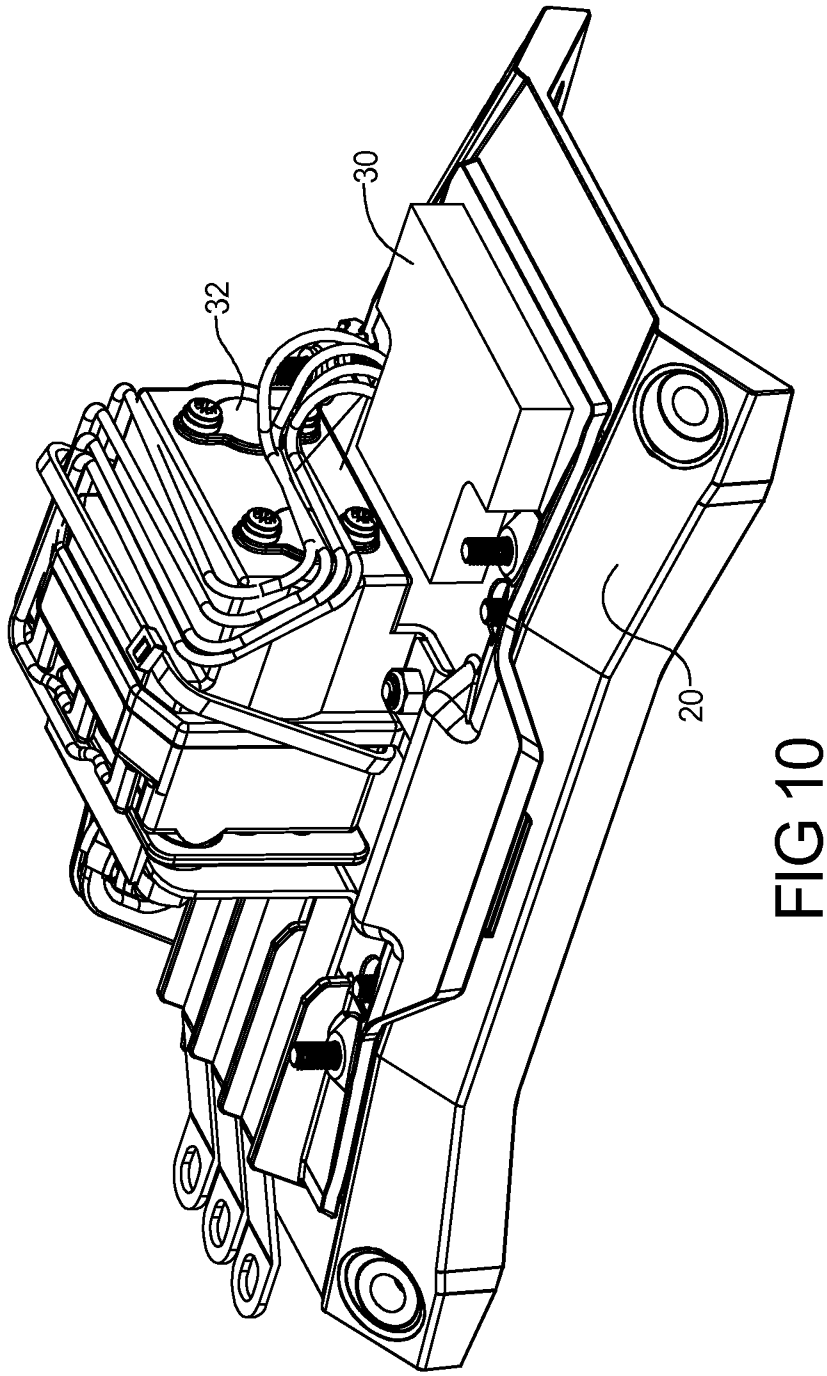
FIG. 10 is a perspective view of the winch control module according to the principles of the present disclosure.

It is noted that the interconnection between the components of the winch control module 30 are illustrated in detail in FIG. 7 and the interconnection of the components of a wireless remote 40 are illustrated in FIG. 8. FIGS. 10 and 11 illustrate the connection of the accessories to the winch control module 30 using a two-pin SAE connector 68*a*-68*c*, or a four-pin SAE connector 69.

It is noted that in current systems, each accessory that is added to a vehicle needs its own wiring harness that is connected back to the vehicle battery and for the accessories that would require in-cab control, the switches have to be installed into the original equipment dashboard or another location within the cab of the vehicle which can be undesirable to the vehicle owner. Accordingly, the present disclosure allows for a single remote control 40 to operate the winch 10 and several vehicle accessories without requiring separate control switches. The remote control 40 is very useful in operating the winch 10 to allow the user to stand at a distance from the vehicle when the winch 10 is in use. Furthermore, the ability to place the clutch actuator 36 into free spool mode at a remote location also is a convenient function to permit the user to place the winch 10 in free spool mode without having to manually do so at the winch. This allows the user to spool out the winch cable 18 and attach the cable 18 to another vehicle or structure without having to return to the winch before activating the winch.

Furthermore, the use of accessory control modules 44, 46 and the winch control module 30 for controlling various accessories greatly reduces the amount of wiring that is needed to be added to a vehicle in order to power the accessories. The use of the existing high-capacity electrical cables 70 of the winch motor 12 also allows for multiple functions to be performed with these high-capacity cables 70 without having to duplicate the expense of the cables.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A winch comprising:

a drum;

a motor drivingly attached to said drum;

a pulling line wrapped around said drum;

a battery selectively connected to said motor via a winch power cable;

a winch control module for connecting said motor to said battery; and a control device in communication with said winch control module for operating said winch and an auxiliary electrical device, where said winch control module is configured to connect to the auxiliary electrical device, where said control device provides two-way communication with said winch control module for providing control signals for operation of said winch and said auxiliary electrical device and for receiving signals indicating an operational status of said winch and said auxiliary electrical device, said control device including a display providing a visual indication of the operational status of said auxiliary electrical device, and where said control device includes a mode select input, a winch "in" input, a winch "out" input, and one or more accessory buttons for turning said auxiliary electrical device on and off.

2. The winch according to claim 1, wherein the winch control module includes a connector for connecting the auxiliary electrical device to the winch control module.

3. The winch according to claim 1, wherein said auxiliary electrical device includes a light and said operational status includes one of on and off.

4. The winch according to claim 1, wherein said auxiliary electrical device includes a compressor and said operational status includes pressure data.

5. The winch according to claim 1, wherein said auxiliary electrical device includes an electromagnetic solenoid clutch actuator for disengaging a clutch of the winch to permit the drum to free spool and said operational status includes a free spool indicator to indicate that the drum is in free spool.

6. A winch comprising:

a rotatable drum;

a motor drivingly connected to said rotatable drum;

a pulling line wrapped around said drum;

a power source selectively connected to said motor;

a winch control module for connecting said power source to said motor; and a control device providing a two-way wireless communication with said winch control module for providing control signals for operation of said winch and for receiving signals from said control module indicating an operational status of said winch, said control device including a display providing a visual indication of the operational status of said winch, where said operational status includes at least one of high temperature, low battery, overload, and free spool.

7. The winch according to claim 6, wherein said display of said control device displays user information on winch control features.

8. The winch according to claim 6, wherein said winch control module further includes a processor unit and an accessory control switch in communication with said processor unit for controlling operation of an auxiliary electrical device connected to said accessory control switch.

9. The winch according to claim 6, wherein said power source is a battery and wherein said winch control module is in communication with a winch motor contactor for connecting said motor to said battery.

10. The winch according to claim 6, further comprising a gear train drivingly connecting said motor to said rotatable drum, said gear train including a clutch that is operable to be disengaged from said rotatable drum to allow said rotatable drum to free spool, said clutch being disengaged by a clutch actuator, said clutch actuator being controlled by said winch control module.

11. The winch according to claim 10, wherein said control device includes a plurality of buttons including a first button for controlling the clutch actuator, a second button for controlling a power-in state of the winch, and a third button for controlling a power-out state of the winch.

12. The winch according to claim 11, wherein the plurality of buttons further includes a fourth button for selecting a desired control mode and accessing programmable functions.

13. The winch according to claim 12, wherein the plurality of buttons further includes a fifth button for resetting the control device.

14. The winch according to claim 6, wherein the winch control module includes one or more accessory control switches for communication with one or more additional vehicle accessories coupled to a vehicle in which the winch is installed and wherein the control device includes a plurality of buttons including a button for controlling operation of the one or more additional vehicle accessories.

15. The winch according to claim 6, wherein said control device communicates with said winch control module through an encrypted wireless communication protocol.

16. The winch according to claim 6, wherein the winch control module includes one or more connectors for connecting one or more additional vehicle accessories to the winch control module.

17. The winch according to claim 16, wherein the one or more additional vehicle accessories include auxiliary lights including one or more of a spot light, light bar, sport lighting, brake light, and parking light.

18. The winch according to claim 16, wherein the winch control module includes a power management module for managing a distribution of power from the power source to the winch and the one or more additional vehicle accessories.

19. The winch according to claim 6, wherein said two-way wireless communication with said control device and said winch control module includes a two-way RF mesh network connection using a secured and encrypted wireless communication protocol.

20. The winch according to claim 6, wherein said operational status further includes one or more of winch motor current draw, winch motor temperature, winch load, and winch clutch position.

21. A winch comprising:

a rotatable drum;

a motor drivingly connected to said rotatable drum;

a pulling line wrapped around said drum;

a power source selectively connected to said motor;

a winch control module for connecting said power source to said motor; and a control device providing a two-way wireless communication with said winch control module for providing control signals for operation of said winch and for receiving signals from said control module indicating an operational status of said winch, said control device including a display providing a visual indication of the operational status of said winch, where said display of said control device displays safety warnings for operation of the winch.

22. The winch according to claim 21, wherein said power source is a vehicle battery of a vehicle in which the winch is installed and wherein said display provides a visual indication of vehicle battery voltage.

23. The winch according to claim 21, further comprising a winch clutch actuator for selectively disengaging the rotatable drum and the motor and a winch motor contactor, the winch clutch actuator and winch motor contactor controlled by the winch control module.

24. The winch according to claim 23, wherein the control device includes a plurality of buttons including a first button for controlling a power-in state of the winch, a second button for controlling a power-out state of the winch, and a third button for controlling a winch clutch actuator.

25. The winch according to claim 24, wherein the plurality of buttons further includes a fourth button for selecting a desired control mode and accessing programmable functions.

26. The winch according to claim 24, wherein the plurality of buttons further includes a fifth button for resetting the control device.

27. The winch according to claim 21, wherein said winch control module further includes a processor unit and an accessory control switch in communication with said processor unit for controlling operation of an auxiliary electrical device connected to said accessory control switch.

28. The winch according to claim 21, wherein the winch control module includes one or more accessory control switches for communication with one or more additional vehicle accessories coupled to a vehicle in which the winch is installed and wherein the control device includes a plurality of buttons including a button for controlling operation of the one or more additional vehicle accessories.

29. The winch according to claim 28, wherein the one or more additional vehicle accessories include auxiliary lights including one or more of a spot light, light bar, sport lighting, brake light, and parking light.

30. The winch according to claim 28, wherein the winch control module includes a power management module for managing a distribution of power from the power source to the winch and the one or more additional vehicle accessories.

31. A winch comprising:

a rotatable drum;

a motor drivingly connected to said rotatable drum;

a pulling line wrapped around said drum;

a power source selectively connected to said motor;

a winch control module for connecting said power source to said motor; and a control device providing a two-way wireless communication with said winch control module for providing control signals for operation of said winch and for receiving signals from said control module indicating an operational status of said winch, said control device including a display providing a visual indication of the operational status of said winch, where said display of said control device displays installation information.

32. The winch according to claim 31, wherein said operational status includes each of winch motor current draw, winch motor temperature, winch load, and winch clutch position.

33. The winch according to claim 31, wherein the winch control module includes one or more connectors for connecting one or more additional vehicle accessories to the winch control module, where the one or more additional vehicle accessories include auxiliary lights including one or more of a spot light, light bar, sport lighting, brake light, and parking light.

34. The winch according to claim 33, wherein the winch control module includes a power management module for managing a distribution of power from the power source to the winch and the one or more additional vehicle accessories.

35. A winch comprising:

a rotatable drum;

a motor drivingly connected to said rotatable drum;

a pulling line wrapped around said drum;

a power source selectively connected to said motor;

a winch control module for connecting said power source to said motor; and a control device providing a two-way wireless communication with said winch control module for providing control signals for operation of said winch and for receiving signals from said control module indicating an operational status of said winch, said control device including a display providing a visual indication of the operational status of said winch, where said display of said control device displays sales information regarding features of the winch.

36. The winch according to claim 35, wherein the control device includes a plurality of buttons including a first button for controlling a power-in state of the winch, a second button for controlling a power-out state of the winch, a third button for controlling a winch clutch actuator of the winch, a fourth button for selecting a desired control mode and accessing programmable functions, and a fifth button for controlling operation of one or more additional vehicle accessories, where the winch control module includes one or more accessory control switches for communication with the one or more additional vehicle accessories, the one or more additional vehicle accessories coupled to a vehicle in which the winch is installed.

37. The winch according to claim 35, wherein the winch control module includes one or more connectors for connecting one or more additional vehicle accessories to the winch control module, the one or more additional vehicle accessories including auxiliary lights including one or more of a spot light, light bar, sport lighting, brake light, and parking light, and wherein the winch control module further includes a power management module for managing a distribution of power from the power source to the winch and the one or more additional vehicle accessories.

38. The winch according to claim 35, wherein said two-way wireless communication with said control device and said winch control module includes a two-way RF mesh network connection using a secured and encrypted wireless communication protocol and wherein said operational status further includes one or more of winch motor current draw, winch motor temperature, winch load, and winch clutch position.

* * * * *